2 Sheets—Sheet 1.
C. PERLEY.
Operating Ordnance
No. 2,739. Reissued Aug. 20, 1867.
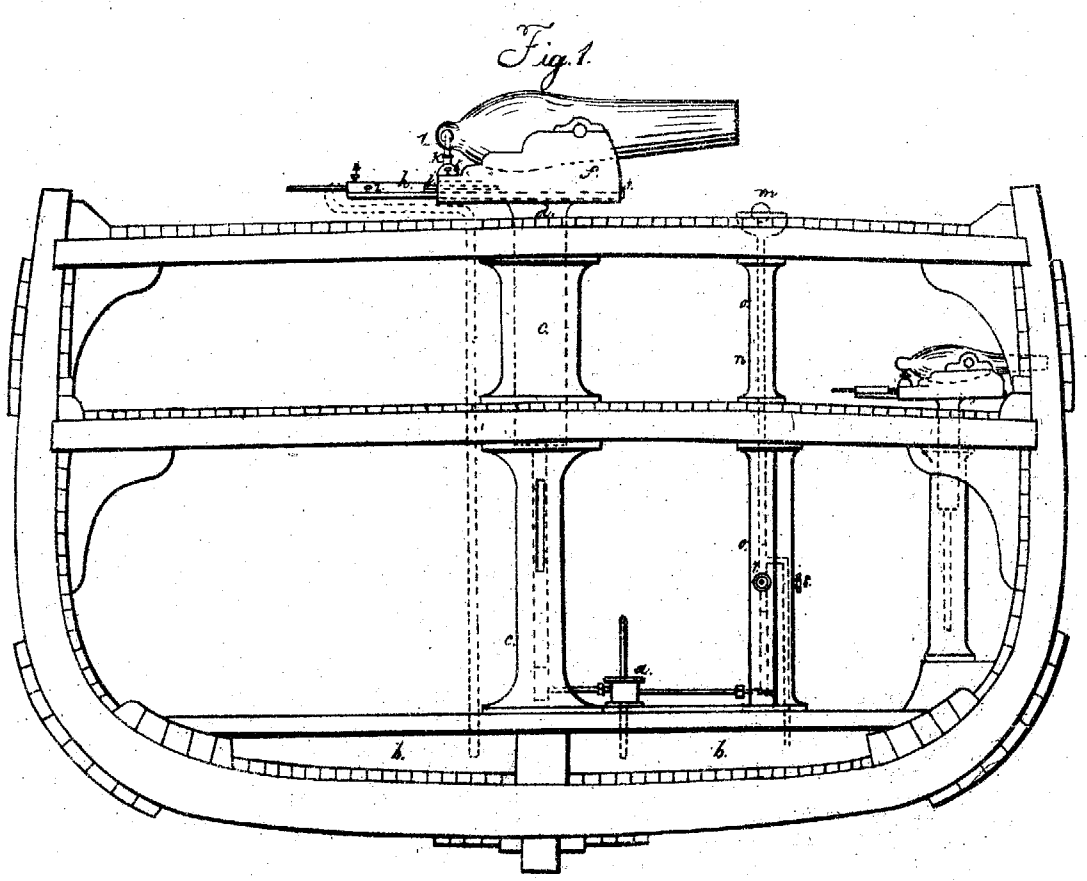
Simeon Hall
Chas H Smith
Charles Perley

C. PERLEY

Operating Ordnance

No. 2,739. Reissued Aug. 20, 1867.

Witnesses.

Simeon Hall

Chas H Smith

Inventor.

Charles Perley

UNITED STATES PATENT OFFICE.

CHARLES PERLEY, OF NEW YORK, N. Y.

IMPROVEMENT IN OPERATING ORDNANCE.

Specification forming part of Letters Patent No. 51,475, dated December 12, 1865; Reissue No. 2,739, dated August 20, 1867.

*To all whom it may concern:*

Be it known that I, CHARLES PERLEY, of the city and State of New York, have invented an Improvement in Operating Ordnance; and I do hereby declare the following to be a full, clear, and exact description of the said invention, reference being had to the annexed drawings, making part of this specification, wherein—

Figure 3:
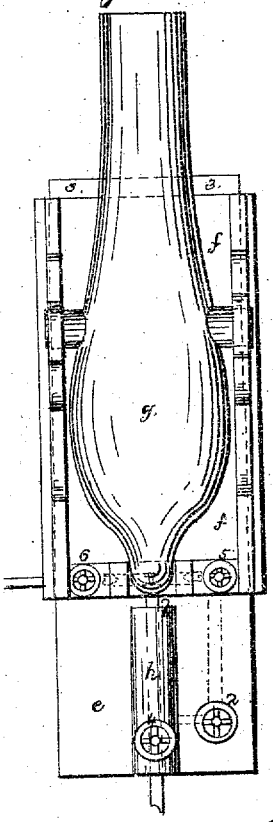
Figure 4:
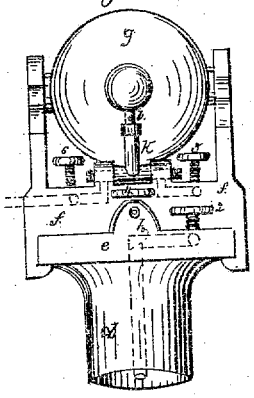
Figure 2:
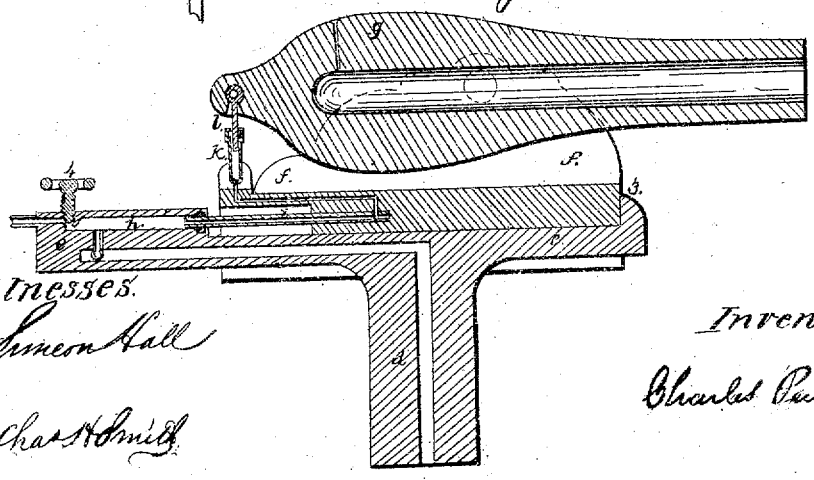

Figure 1 is a transverse section representing a vessel in which is a cannon fitted with my improvements. Fig. 2 is a section of the cannon and carriage. Fig. 3 is a plan of said cannon and carriage, and Fig. 4 is a rear elevation of the same.

Similar marks of reference denote the same parts.

My invention relates to operating ordnance by pressure; and it consists, first, in sustaining the gun or mortar on a ram, so that it may be raised or lowered at pleasure for loading behind a breastwork or protection, and elevating for firing, and on which ram the gun can be turned or swiveled at pleasure with but little friction in consequence of being sustained by the liquid; second, in a hydraulic recoil-check that consists in a plunger to press liquid out of a cylinder or chamber through an opening or openings, and thereby gradually stop the recoil of the gun; third, in projecting the gun or forcing it forward (after being loaded) by means of hydraulic pressure applied to a plunger to press it along in a chamber and drive the gun forward by means of such plunger; fourth, in adjusting or sighting the gun by pressure acting through a plunger or rod in a chamber to raise the cascabel or allow it to descend by the escape of fluid from such chamber; and, fifth, in the elevation of the charge by a carriage that is fitted in a position to coincide, when elevated, with the end of the muzzle, so that the projectile can be rolled upon this carriage and then raised to the muzzle and forced in with great facility.

In the drawings, *a* is a hydraulic pump actuated by competent means. An engine is preferable, and said pump is to be constructed in any usual or desired manner, and, being well known in the arts, requires no further description.

A well or tank for water or other liquid is to be provided in any convenient place. I have represented the same at *b*, and I remark that this apparatus may be actuated by any other fluid or liquid—such as alcohol, petroleum, or oils—although in the description the term "water" generally will be used.

*c* is a cylinder, that is to extend in a vessel from one deck to the other, or it may pass through the main deck and rest on the keelson, as shown. In this cylinder *c* is a ram, *d*, which forms the pivot of the gun, and on which it turns or swivels, and by which it is raised or lowered. In consequence of having this pivot or pintle pass through the deck and supported below, the gun-deck is not strained by the weight of the gun, and has only to sustain the pintle against the recoil. The hydraulic cylinder *c* is provided with a packing, as usual, and the ram at the part passing through the packing is to be of a size adapted to sustaining the weight of the gun with a given pressure per square inch on the water; but the upper part of said ram which form the pivot or pintle should be larger, as shown, so as not to be damaged by a shot if struck by the same. The upper end of this pintle is formed with a bed, *e*, upon which are parallel edges or slides for the gun-carriage *f*, supporting the gun *g* by the trunnions, or in any usual manner.

I provide a water-cylinder, *h*, and a plunger, *i*, the cylinder or chamber *h* being connected by means of a hole, 1, to the water in the hydraulic cylinder *c*, and the plunger *i* being attached to the gun-carriage *f*.

The parts thus far described are to be operated as follows: The water is allowed to escape from the cylinder *c* by any suitable valve, so as to lower the gun for loading. After this is done, and it is desired to prepare the same for firing, the gun is raised bodily by the hydraulic ram as water is pumped into the cylinder *c*. The gun is slid forward, either before or after or while being raised, by opening a cock or valve, 2, and allowing the pressure of water to act in the cylinder *h* to force out the plunger *i* and force the gun forward. A stop may be provided at 3 to prevent the gun going too far. When the piece is in position for firing, the cock 2 is to be closed and a cock or valve, 4, opened. When the firing takes place, the recoil of the gun drives the plunger *i* back into the water-chamber *h*, ejecting the water through the valve or cock 4, and according to the size of opening compared with the plunger and recoil force, so the gun can be entirely stopped in running back a greater or less distance. The liquid ejected in the recoil may be conveyed back to the tank *b* by a pipe or flexible tube. (See dotted lines, Fig. 1.) The recoil may be checked by driving the water back into the hydraulic cylinder. In this case the water-passages would require to be large and curved where they change directions, and the size of the plunger must be proportioned to the force of recoil and the pressure in the cylinder *c*, because the recoil-plunger will in this case act like a pump, and in throwing the water back into the hydraulic cylinder slightly raise the gun itself.

In order to raise or lower the gun for taking aim, I employ a cylinder, *k*, which I have shown as connected to the hydraulic cylinder; and *l* is a plunger acting against or attached to the cascabel. The water is admitted, under pressure, through a valve at 5 to raise the back end of the gun; or it may be allowed to run out for lowering the same by turning the valve 6. I prefer that the cylinder *k* be mounted on a swinging hollow center, as represented, so as to allow the ingress and egress of the liquid at the same time that the cylinder may swing to accommodate the movement of the cannon on its trunnions.

I have represented the supply of liquid as passing through the plunger *i* and gun-carriage *f* to the cylinder *k*, as this will allow of the water, under pressure, reaching the said cylinder *k* with ease, notwithstanding the provision for said carriage *f* moving on the bed *e;* but the liquid or fluid in this cylinder *k* may be supplied in any convenient manner to effect the sighting of the gun by its pressure on the plunger *l*.

It will be evident that by this means the largest-sized gun can be handled by one man, the hydraulic pumps being kept in motion by power. In this case, however, it would be necessary that valves for allowing the water to pass into or escape from the hydraulic cylinder *c* should be connected to the place where the gunner stands, that he may have the whole under his immediate control and within reach; and I do not limit myself in any respect to the arrangement of valves and water-ways, as these must depend on the size and character of guns and the location where the same may be placed, as my improvement is adapted to fortifications as well as to vessels.

The red lines in Fig. 1 represent the improvement as applied to guns on the main deck adapted to firing out of port-holes; and it will be evident that my improvement has great advantages for vessels over the present mode of mounting guns, because lashing is dispensed with, or almost entirely, the gun being always in place, and when not in use can be retained with the center of gravity exactly over the center of the pintle by means of a screw to clamp the carriage to the bed *e;* hence there will be no tendency for the gun to swing around, no matter how much the vessel may roll.

The apparatus for raising up the charge is shown at *m*, and consists in a plunger or rod, *n*, in a cylinder, *o*, that is connected by a pipe with the main cylinder *c*, or other source of pressure. On the upper end of the plunger *n* is the carriage *m*, that sets down into a recess in the deck or platform, so that the shot or charge can be rolled upon the said carriage, and then by turning a cock, 7, the pressure raises up the charge. The same is stopped at the muzzle of the gun by closing the cock 7, and then the charge is rolled or forced into the cannon, and the carriage *m* lowered by opening the cock 8. This apparatus for raising and lowering the gun is not adapted to use with steam or vapor, and any such elastic or compressible substance cannot be employed advantageously for said purpose, because it is necessary that the gun remain very firmly in place while being aimed and fired, and not be subject to vibration or change of position resulting from adjacent explosions or the condensation of vapors, for which reason the steam-cylinders heretofore proposed are not fully available, while with my invention, the operative force being a pressure from water, oil, or other practically non-compressible liquid, the gun-carriage and parts filled by such liquid are for all practical purposes as rigid as if made entirely of metal, and the gun is perfectly under control of a much less number of men than heretofore, hydraulic pressure directed with great facility being substituted for manual labor.

I do not claim, broadly, sustaining the weight of a gun or gun and carriage upon a hydraulic ram. Neither do I claim a spring or recoil shield, nor sustaining the gun by steam or vapor pressure; but

What I claim, and desire to secure by Letters Patent, is—

1. The mode herein specified of elevating a gun or mortar from behind a breastwork or protection previous to its discharge, and the lowering of the same previous to loading, by a hydraulic ram and cylinder, as specified.

2. A plunger and chamber from which there is an opening to form a gradual recoil-check for ordnance by the escape of the fluid or liquid contained in such chamber.

3. Projecting the gun forward by the pressure of a liquid upon a ram or plunger, substantially as specified.

4. Adjusting or sighting a gun by means of pressure acting upon a ram or plunger in a chamber, substantially as specified.

5. Elevating the charge or projectile by pressure acting upon a ram or plunger, substantially as specified.

6. Connecting the chamber in which the recoil-plunger acts with the cylinder sustaining the gun, substantially as specified, so that the pressure in the latter shall force the gun forward, as set forth.

7. Supplying through the sustaining-ram *d* the liquid or fluid that acts by its pressure to project the ram or to adjust or sight the same, substantially as set forth.

In witness whereof I have hereunto set my signature this 16th day of July, A. D. 1867.

CHARLES PERLEY.

Witnesses:
CHAS. H. SMITH,
GEO. D. WALKER.